United States Patent [19]

Prince et al.

[11] Patent Number: 5,340,484
[45] Date of Patent: Aug. 23, 1994

[54] AIR SCRUBBING SYSTEM FOR WASTE WATER TREATMENT

[76] Inventors: Jack E. Prince, P.O. Box 1922, Kerrville, Tex. 78029; William H. Mullins, 230 W. Kings Hwy., San Antonio, Tex. 78212

[21] Appl. No.: 170,395

[22] Filed: Dec. 20, 1993

Related U.S. Application Data

[63] Continuation of Ser. No. 818,546, Jan. 9, 1992, abandoned.

[51] Int. Cl.⁵ .............................................. C01B 17/05
[52] U.S. Cl. .................................... 210/712; 210/721;
210/750; 210/758; 210/765; 210/218; 210/220;
210/194; 261/DIG. 75; 423/220; 423/224;
423/243.03; 423/573.1; 95/216
[58] Field of Search ............... 210/712, 721, 750, 765,
210/218, 220, 194, 718, 758, 188, 197; 423/220,
224, 243.03, 573.1, 576.4; 95/216, 219; 55/236, 237

[56] References Cited

U.S. PATENT DOCUMENTS

| | | |
|---|---|---|
| 1,808,956 | 6/1931 | Ketterer . |
| 3,388,057 | 6/1968 | Callahan . |
| 3,996,139 | 12/1976 | Prince . |
| 4,082,662 | 4/1978 | Prince . |
| 4,511,544 | 4/1985 | Connell . |
| 4,564,457 | 1/1986 | Cairo . |
| 4,956,080 | 9/1990 | Josefik . |
| 5,094,824 | 3/1992 | Van Kleeck . |
| 5,174,973 | 12/1992 | Smith . |

OTHER PUBLICATIONS

"Sulfint Process" by Mackinger et al, Hydrocarbon Processing, Mar. 1982 p. 169–172.

*Primary Examiner*—Thomas M. Lithgow
*Attorney, Agent, or Firm*—Donald R. Comuzzi; Christopher L. Makay

[57] ABSTRACT

The present invention is a gas scrubbing system for removing hydrogen sulfide gas from a wastewater system. Pumps draw wastewater from a wastewater source within the system for injection through aerators which aerats aspirate hydrogen sulfide gas and oxygen from the wastewater source. The aerators mix the wastewater with the hydrogen sulfide gas and oxygen which is returned to the system as oxygenated wastewater containing elemental sulfur. The water and sulphur are then delivered to the treatment plant for final treatment.

2 Claims, 2 Drawing Sheets

AIR SCRUBBING SYSTEM FOR WASTE WATER TREATMENT

This application is a" the continuation application of copending application application under 37 C.F.R. 1.60 of pending prior application Ser. No. 07/818,546, filed on Jan. 9, 1992 (now abandoned).

BACKGROUND OF THE INVENTION

Wastewater treatment is a matter of continuing concern, particularly as the population increases and the availability of potable water decreases, Reuse of wastewater from both industrial and municipal sources as well as agricultural effluents is a necessity.

New governmental regulations and statutes are requiring immediate improvements in the treatment of effluent from all types of wastewater treatment facilities.

In the handling and treatment of sewage, a collection network of sewer lines pick up the raw sewage and deliver it to a treatment plant.

The ultimate goal in the treatment of the raw sewage is to separate all impurities, both organic and inorganic, from the water and return the treated, uncontaminated water in pure form into the ground water or into a river or stream. This ultimate goal is seldom or never achieved, however, it remains a goal that is not only desirable but one that government regulations insist on.

Raw sewage in the collection system begins to breakdown on its travel to the sewage treatment plant due to the action of the anaerobic bacteria on the organic solids. The length of travel to the treatment plant influences the degree of decomposition. Often times the sewage arrives at the plant in a very septic condition causing problems in treatment and obnoxious odors.

Odors in sewage are usually a result of putrefaction of solids in the wastewater. The putrefaction process can produce a variety of odorous compounds. The most prevalent and most obnoxious are those resulting from hydrogen sulfide that is produced by the breakdown of sulphur compounds. Hydrogen sulfide not only produces obnoxious odors, but also can cause devastating corrosion of concrete structures. The hydrogen sulfide generated in the sewer system reacts with oxygen in the presence of oxidizing bacteria and in the humid atmosphere above the water surface in a wet well or other enclosed structure, to produce sulfuric acid as a condensate on the walls of the sewer lines, wet well, or other structure. This acid is strong enough to destroy even the best concrete. If this hydrogen sulfide can be eliminated from the system, both obnoxious odors and corrosion can be controlled.

In the handling of sewage in the collection system, it is possible to commence the treatment of the raw sewage in the collection system and prepare it for final treatment. This pretreatment can reduce the load on the treatment plant and expedite the treatment time.

All of the biological treatment processes are most efficient when the influent wastewater is fresh coming into the treatment plant. Treating efficiency may be adversely affected and the biological process upset if the wastewater becomes septic

PRIOR ART

Aeration of wastewater is one of the key methods of pretreatment. An apparatus disclosed in U.S. Pat. No. 3,996,139 and No. 4,082,662 discloses a very effective apparatus for wastewater treatment by aeration.

The apparatus disclosed therein not only aerates the waste liquid but also shears the organic solids into macroscopic particles thereby releasing the entrained gases, and floats the oil and grease. This pretreatment which may occur in a lift station in the transport lines or within the treatment plant proper, marks for far greater precipitation of solids in the primary clarifier.

SUMMARY OF THE INVENTION

While the pretreatment has been very effective in impeding the action of the anaerobic bacteria, thus reducing the production of the noxious hydrogen sulfide gas, it does not address the problems associated with the hydrogen sulfide gas which has already been produced by the time the sewage reaches the lift station for pretreatment. The adverse effect of this gas is well known. The noxious odors are very offensive, however, the most damage results from the sulfuric acid which is produced on the walls and other surfaces inside the lift station causing structural deterioration.

It is an object of the present invention to provide an improvement to the pretreatment systems presently in use for the purpose of eliminating the hydrogen sulfide gas above the waterline in the wet well of a lift station thus eliminating the noxious odors and structural damage from corrosion.

The gas scrubbing system of this invention employs an aspirator of the general type disclosed in U.S. Pat. No. 4,082,662 having an elongate, constant-area mixing chamber at and immediately downstream from the point at which the air is drawn through air inlet ports into the liquid. The inlet ports are relatively large to allow large quantities of air to be sucked into the system. The air inlet ports communicate with the space above the waterline in the wet well of the lift station to draw air and hydrogen sulfide gas from the wet well into the mixing chamber for mixing with the raw sewage to be neutralized and returned to the wet well as more fully described hereinafter.

The hydrogen sulfide gas in the presence of water and large quantities of oxygen is reduced to water and elemental sulphur. This system may be used to treat and control hydrogen sulfide in selected lift stations thus controlling odor and corrosion throughout an entire city collection and treatment system.

DETAILED DESCRIPTION OF THE PREFERRED EMBODIMENT

Figure 1:
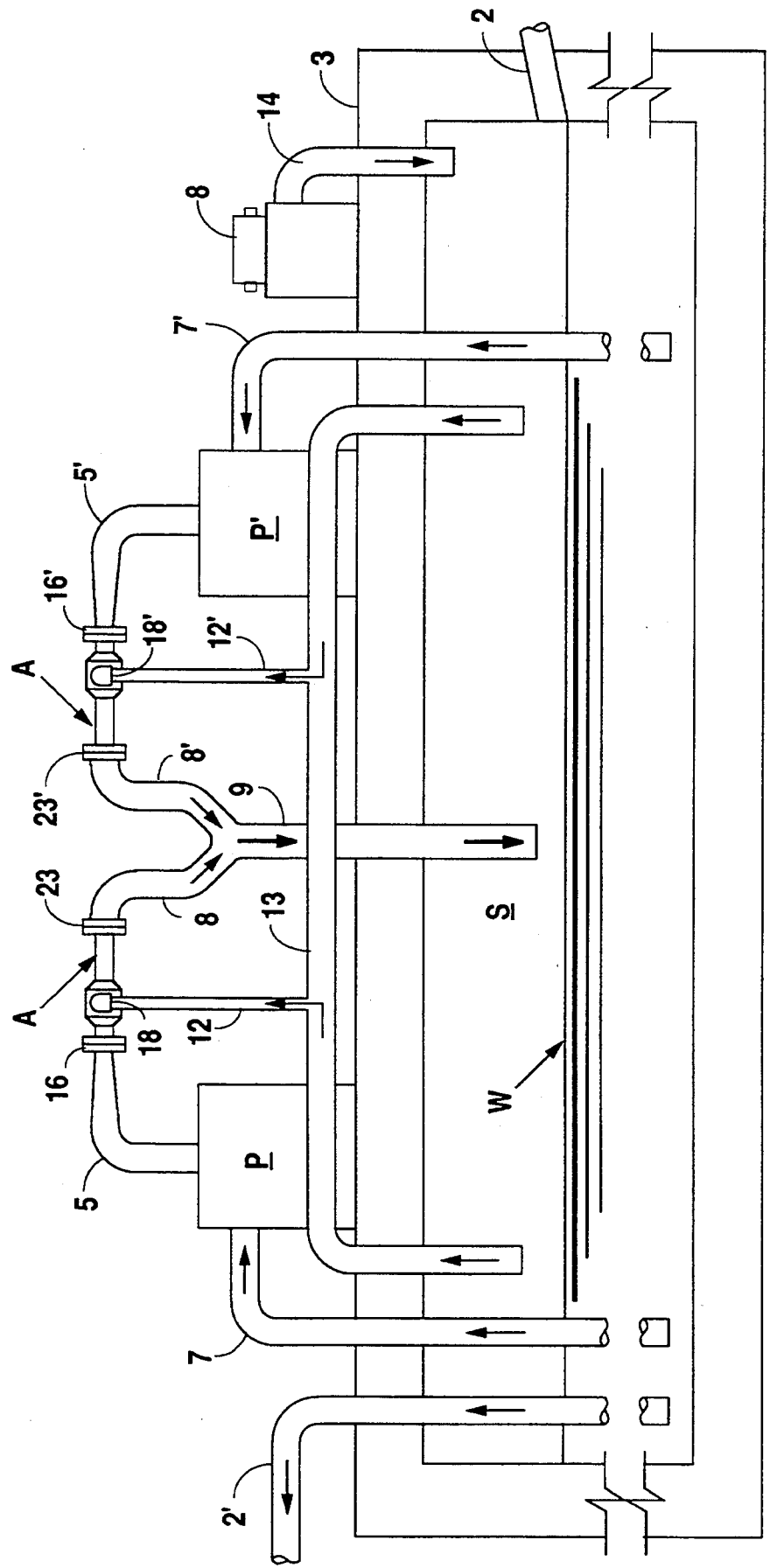
FIG. 1 is a schematic view showing the gas scrubbing system installed over a lift station.

FIG. 1 depicts the gas scrubbing system positioned over the top of a lift station in a wastewater treatment system such as a sewage collection and treatment system. Wastewater flows into the wet well via conduit 2 and exits the wet well via a conduit 2'. A pump (not shown) is connected to the downstream side of conduit 2'. The top of the wet well may be a concrete slab 3 which serves as a platform to support the components of the scrubbing system which includes a pair of pumps P and P' connected on the outlet side via conduit 5 and 5' to the inlet end 16 and 16' of a pair of aerators A and A'. The pumps P and P' communicate at their inlet side via conduits 7 and 7' with the wastewater W in the wet well of the lift station. The aerators A and A' communicate at their outlet end via conduits 8, 8' and 9 with the wastewater W in the wet well. The aerators have air inlets apertures 18 and 18' which communicate with the space S above the wastewater in the wet well of the lift station via conduits 12, 12' and a header pipe 13. An air blower B communicates with the space S via conduit 14.

Figure 2:
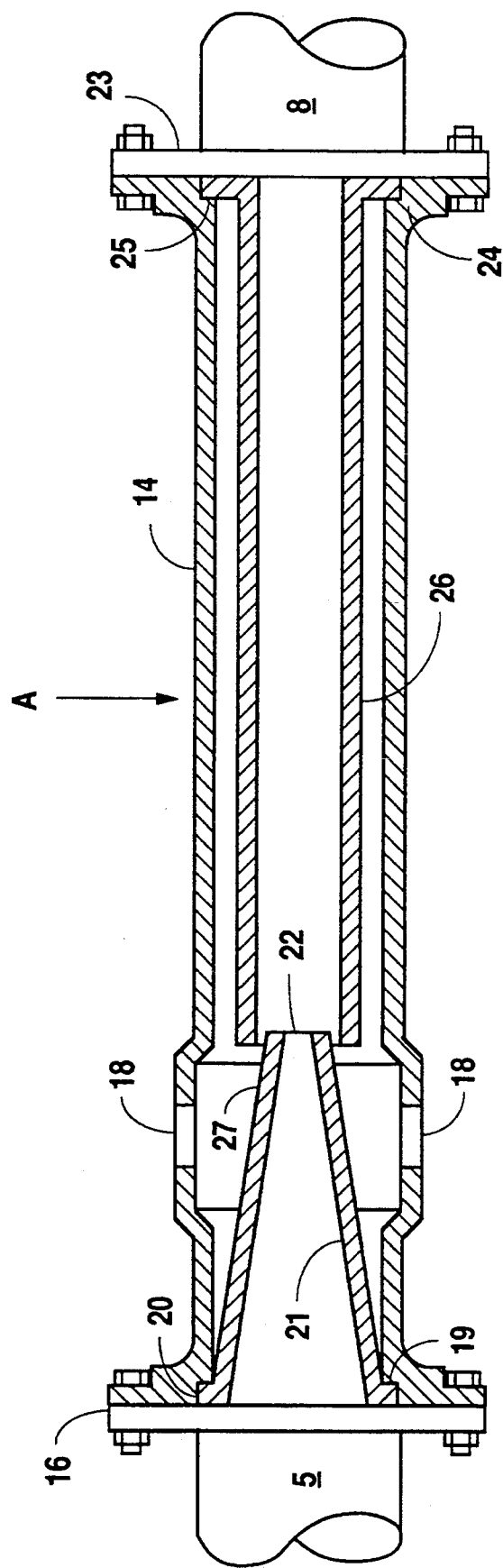
FIG. 2 is a sectional view showing the preferred aerator of this invention.

FIG. 2 shows a cross-section of the preferred aerator A. It is understood that the aerator A' is identical in all respects thus only one description is provided. The aerator A includes a casing 14 having an enlarged portion 15 adjacent the inlet end 16. The enlarged portion 15 has a plurality of apertures 18 which in this preferred embodiment communicates via the conduit 12 (FIG. 1) with the space S above the waterline. The inlet end 16 has an annular recess 19 to receive a closely fitting rim 20 of a tapered member or cone 21 which tapers inwardly and terminates in a relatively small nozzles 22 adjacent the downstream end of the enlarged portion 15.

The outlet end 23 of the aerator A has an annular recess 24 to receive a closely-fitting rim 25 of an elongated, tubular mixing chamber 26. The mixing chamber 26 extends coaxially of the casing 14. The mixing chamber terminates in an aspirating aperture 27 surrounding the discharge nozzle 22 of the cone 21.

OPERATION OF THE PREFERRED EMBODIMENT

In use, the system of the present invention is located adjacent a source of liquid to be treated, such as a existing process tank or a lift station.

The pumps P and P' draw wastewater W via conduits 7 and 7' and force it through the conduits 5 and 5' into the aerators A and A' and out through the conduits 8, 8', and 9 back into the wastewater W. Inside the aerators, the wastewater passes through the cone 21 and the mixing chamber 26 to the discharge conduits 8 and 8'. The "jump" at the nozzle 22 causes aspiration of air through the aperture 27, as in ordinary venturi aerators. Since the air inlet opening 18, 18' communicate with the space S above the water level, the air and hydrogen sulfide gas in space S are sucked through the inlet opening 18, 18' and aspirated through aperture 27. An ample supply of oxygen in an amount sufficient to satisfy the demands of the aerators A and A' is supplied to the space S by the air blower B.

The oxygen and hydrogen sulfide gas are incorporated and thoroughly mixed in the flowing, confined liquid passing within the mixing chamber 26.

The hydrogen sulfide gas is therefore removed from the space S and is mixed with large quantities of oxygenated wastewater which converts the hydrogen sulfide into water and elemental sulphur. These of course are discharged back into the wastewater stream for delivery to the treatment plant. The oxygen acts also to impede the anaerobic bacteria from further attacking the sulphur bearing organic solids thus the wastewater arrives at the treatment plant in a relatively fresh condition and the odorous and corrosive hydrogen sulfide gas has been eliminated from the lift station.

Having now described a preferred embodiment, what we claim as our invention is:

1. A method of pretreating waste water sewage contained in a wetwell of a lift station by eliminating hydrogen sulfide gas to remove its noxious odor and prevent it from forming sulfuric acid on the walls of the wetwell, comprising the steps of:

providing a flow of waste water sewage to the wetwell;

collecting hydrogen sulfide gas, a byproduct of the waste water sewage, in an air space above the waste water in the the wetwell;

transporting the waste water sewage from the wetwell to an aerator that includes an aspirator;

transporting the hydrogen sulfide gas to the aerator;

mixing and aspirating quantities of hydrogen sulfide gas with said waste water sewage gas in the aerator to eliminate the hydrogen sulfide gas by oxygenating it to convert it into water and elemental sulphur; and returning the water, elemental sulphur, and waste water sewage to the wetwell.

2. The method according to claim 1 further comprising the step of supplying air to the air space above the waste water in the wetwell to provide additional air during the mixing and aspirating of quantities of said hydrogen sulfide gas with said waste water sewage.

* * * * *